United States Patent [19]
Wagner

[11] Patent Number: 6,116,659
[45] Date of Patent: Sep. 12, 2000

[54] BAND CLAMP FOR SEALING LAP JOINTS AND METHOD THEREOF

[75] Inventor: Wayne M. Wagner, Apple Valley, Minn.

[73] Assignee: Donaldson Company, Inc., Minneapolis, Minn.

[21] Appl. No.: 09/028,848

[22] Filed: Feb. 24, 1998

[51] Int. Cl.[7] .................................................. F16L 17/00
[52] U.S. Cl. ........................... 285/373; 285/420; 285/382
[58] Field of Search .................................... 285/420, 419, 285/373, 256, 382, 253, 322, 23, 424, 148.23; 24/279; 277/602, 609, 625, 626, 612

[56] References Cited

U.S. PATENT DOCUMENTS

| | | |
|---|---|---|
| Re. 30,042 | 7/1979 | Hiemstra et al. . |
| 3,348,629 | 10/1967 | Cassel . |
| 3,508,770 | 4/1970 | Cassel . |
| 3,525,419 | 8/1970 | Cassel . |
| 3,572,778 | 3/1971 | Cassel . |
| 3,574,358 | 4/1971 | Cassel . |
| 3,645,357 | 2/1972 | Cassel . |
| 3,653,696 | 4/1972 | Cassel . |
| 3,730,293 | 5/1973 | Cassel . |
| 3,827,733 | 8/1974 | Cassel . |
| 3,863,964 | 2/1975 | Cassel . |
| 3,905,623 | 9/1975 | Cassel . |
| 3,944,265 | 3/1976 | Hiemstra et al. . |
| 4,056,273 | 11/1977 | Cassel . |
| 4,113,289 | 9/1978 | Wagner et al. . |
| 4,142,743 | 3/1979 | McGowen et al. . |
| 4,261,600 | 4/1981 | Cassel . |
| 4,270,689 | 6/1981 | Canfield . |
| 4,312,526 | 1/1982 | Cassel . |
| 4,466,642 | 8/1984 | Tonchen . |
| 4,482,161 | 11/1984 | Izzi, Sr. ................................ 277/612 X |
| 4,558,891 | 12/1985 | Wagner et al. . |
| 4,609,213 | 9/1986 | Tonchen . |
| 4,623,164 | 11/1986 | Cassel et al. . |
| 4,629,226 | 12/1986 | Cassel et al. . |
| 4,660,862 | 4/1987 | Cassel et al. . |
| 4,790,574 | 12/1988 | Wagner et al. . |
| 4,813,720 | 3/1989 | Cassel . |
| 5,116,083 | 5/1992 | Gillingham et al. . |
| 5,310,158 | 5/1994 | Cassel . |
| 5,588,680 | 12/1996 | Cassel et al. . |
| 5,632,513 | 5/1997 | Cassel . |

Primary Examiner—Lynne H. Browne
Assistant Examiner—David E. Bochna
Attorney, Agent, or Firm—Merchant & Gould P.C.

[57] ABSTRACT

A clamp arrangement for sealing a lap joint includes first and second reinforcing bars and a ductile band with first and second end portions wrapped around first and second reinforcing bars. A gasket member is positioned between the first and second reinforcing bars. The gasket member includes a deformation opening for allowing the gasket member to conform to a step in a lap joint. The gasket member is constructed and arranged to maintain the first and second reinforcing bars in parallel alignment, when the clamp arrangement is tightened around the step of the lap joint. Methods using these clamp arrangements are provided herein.

40 Claims, 5 Drawing Sheets

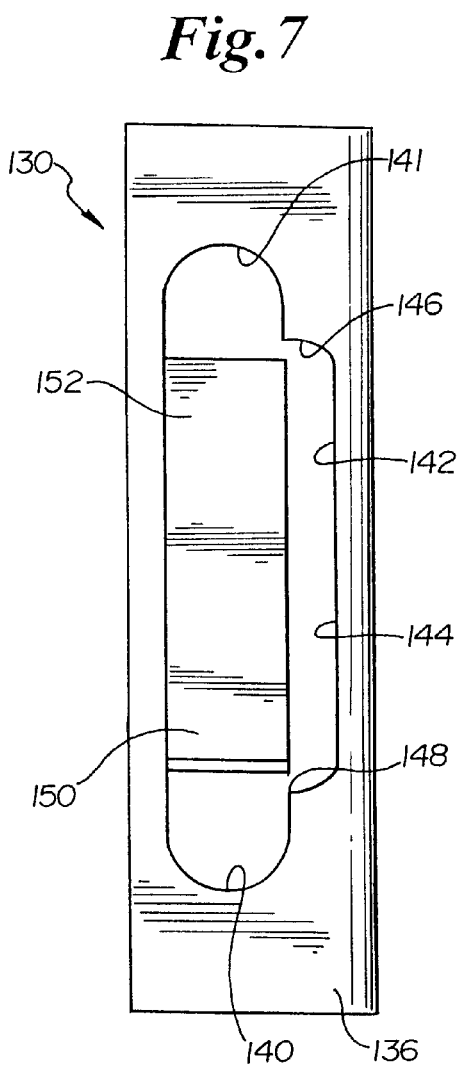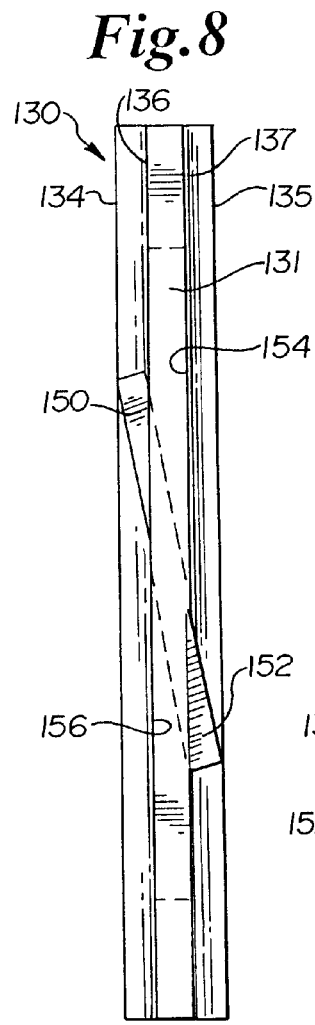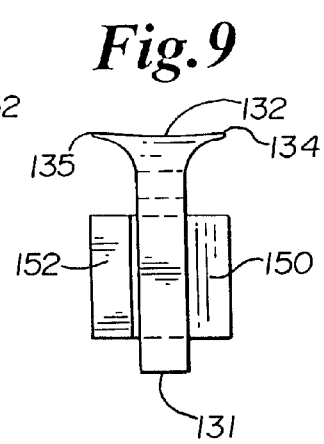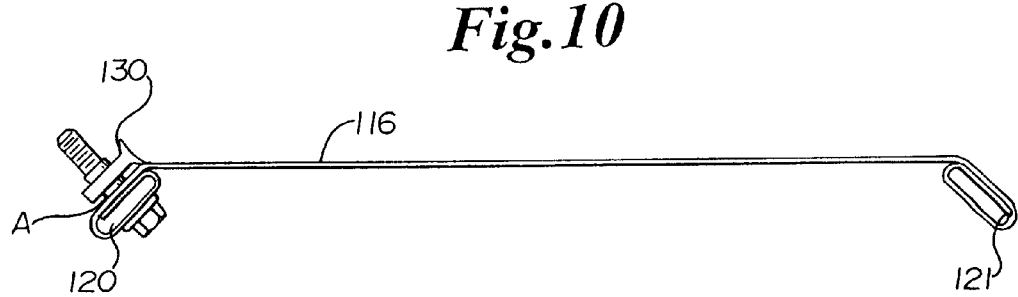

6,116,659

BAND CLAMP FOR SEALING LAP JOINTS AND METHOD THEREOF

FIELD OF THE INVENTION

This invention relates to conduit connectors. More particularly, this invention relates to a band clamp to join tubular conduits in end-to-end relation to form a sealing joint.

BACKGROUND OF THE INVENTION

Clamps for joining and sealing tubular conduits such as truck exhaust pipes in end-to-end relation using stretchable metal bands are known. For example, one such clamp is disclosed in U.S. Pat. No. Re. 30,042.

Band clamps are sometimes utilized in lap joints. A lap joint is formed when an end of one conduit or pipe having a first diameter is placed inside the end of a second conduit or pipe having a diameter larger than the first diameter. Because the second conduit overlaps the first conduit, it is said to form a lap joint. At the seam where the joint is formed, there is a step, due to the differences in diameter of the two conduits. Band clamps have been used to wrap around the joint to secure it in place and to help effect a tight seal between the two conduits.

Band clamps have sometimes utilized a spacer bar to help effect a strong lap joint. One example of this is shown in U.S. Pat. No. 4,312,526.

SUMMARY OF THE INVENTION

The invention comprises a gasket member for use in sealing a lap joint including a step formed between overlapping pipes. The gasket member comprises an elongate main, or first, portion defining at least one bolt opening extending transversely therethrough. The main portion defines a deformation opening for allowing the gasket member to conform to the step of the lap joint. A pair of flanges project outwardly along the sides of the elongate main portion. The flanges extend longitudinally along one end of the main portion.

When the gasket member of the present invention is used in a conduit or pipe clamp, the gasket member is allowed to deform or collapse in the region of the deformation opening to help effect a seal. Further, when the gasket member is used with a clamp arrangement over a lap joint involving flex hose, the flanges prevent the flex hose from pinching or getting trapped in between opposing ends of the band clamp.

In one arrangement, the deformation opening comprises a longitudinal slot extending at least about 40 percent of a length of the main portion of the gasket member. In certain arrangements, the longitudinal slot is in communication with the bolt holes defined by the gasket member.

In other arrangements, the deformation opening comprises a transverse slot defined by the main portion of the gasket member.

Preferably, the main portion of the gasket member is constructed and arranged to maintain a pair of spacer bars on a clamp assembly in parallel alignment, when the gasket member is positioned between the spacer bars and the clamp assembly is tightened the step of the lap joint. This allows for a uniform force across the seal region of the band clamp. This also provides an indicator that the clamp is properly tightened.

In one arrangement, opposite side of the main portion of the gasket are curved. Preferably, the main portion defines an elongate Z-shape.

In other arrangements, a main portion of the gasket member includes a pair of cantilever member projecting outwardly from the opposite sides of the main portion of the gasket member.

In an other aspect, the invention is directed to a clamp arrangement for sealing a lap joint including a step formed between overlapping conduits of dissimilar diameters. The clamp arrangement comprises first and second reinforcing bars, a ductile band having first and second end portions, where the first portion is wrapped around the first reinforcing bar and the second end portion is wrapped around the second reinforcing bar, a gasket member positioned between the first and second reinforcing bars, and a pair of bolts extending in between each of the bolt receiving apertures. The gasket member preferably defines a deformation opening for allowing the gasket member to conform to the step of the lap joint.

Preferably, the gasket member is constructed and arranged to maintain the first and second reinforcing bars in parallel alignment, when the clamp arrangement is tightened around the step of the lap joint.

In preferred arrangements, the band includes a first region having a first diameter, a second diameter larger than the first diameter, and a stepped portion between the first and second regions, when the band is configured in a circular configuration.

Methods for sealing a lap joint utilizing the clamp arrangements and gaskets are provided herein.

Various features and advantages of the arrangements and methods summarized above are pointed out with particularity in the description of the preferred embodiments and the claims, as well as the drawings.

BRIEF DESCRIPTION OF THE DRAWINGS

FIG. 7 is a front elevational view of a gasket member used in the FIG. 6 embodiment, according to the present invention.

FIG. 8 is a top plan view of the gasket member depicted in FIG. 7, according to the present invention.

FIG. 9 is an end elevational view of the gasket member depicted in FIG. 7, according to present invention.

FIG. 10 is a side elevational view of the band clamp of FIG. 6, prior to being wrapped around a lap joint, according to the present invention.

DETAILED DESCRIPTION OF THE PREFERRED EMBODIMENT

I. Some Problems With Existing Arrangements

Figure 14:
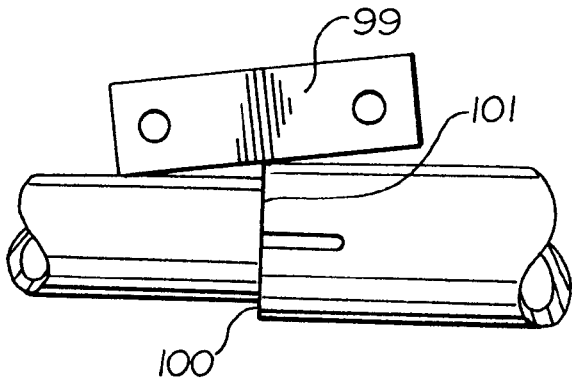
FIG. 14 is a front elevational, somewhat schematic, view of a prior art gasket member positioned over a lap joint.

Certain band clamps which utilize a spacer bar between ends of the band do not work well in lap joints. That is, the spacer bar does not conform to the step in the lap joint. See, for example, FIG. 14. In FIG. 14, a prior art spacer bar 99 is shown over a step 100 in a lap joint 101. The remaining band clamp apparatus is removed in FIG. 14, for purposes of clarity. As shown in FIG. 14, the gasket member 99 remains straight over the step 100, and does not conform to the step 100. This lack of conformity causes leakage on the large end of the clamp.

Another problem with existing arrangements is when a band clamp is used on flexible hose tube. When attempting to seal the lap joint, the clamp action can pinch the tube between opposite ends of the band.

Figure 5:
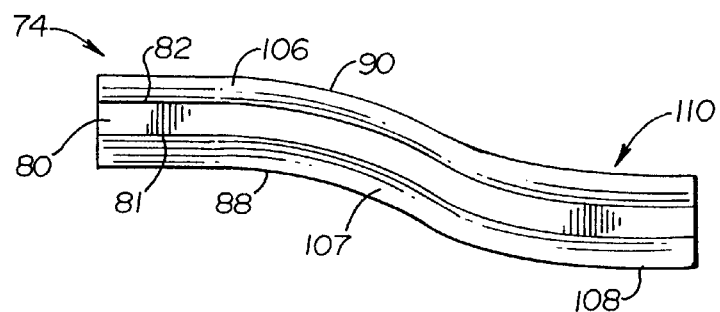
FIG. 5 is a top plan view of the gasket member depicted in FIG. 4.

Another problem with existing clamp arrangements in illustrated in FIG. 5 of U.S. Pat. No. 3,944,265. As the bolts are being tightened in the clamp, the spacer bars tip at significant angles, causing difficulty in clamping and possibly leaks in the seam.

Arrangements of the invention described herein provide for a band clamp with a deformable gasket bar that conforms to the step of the lap joint, prevents intermediate pinching of flex hose, and reduces the angle of the bars at assembly to provide for easier clamp assembly and a leak-proof seam.

II. FIGS. 1–15

Figure 1:
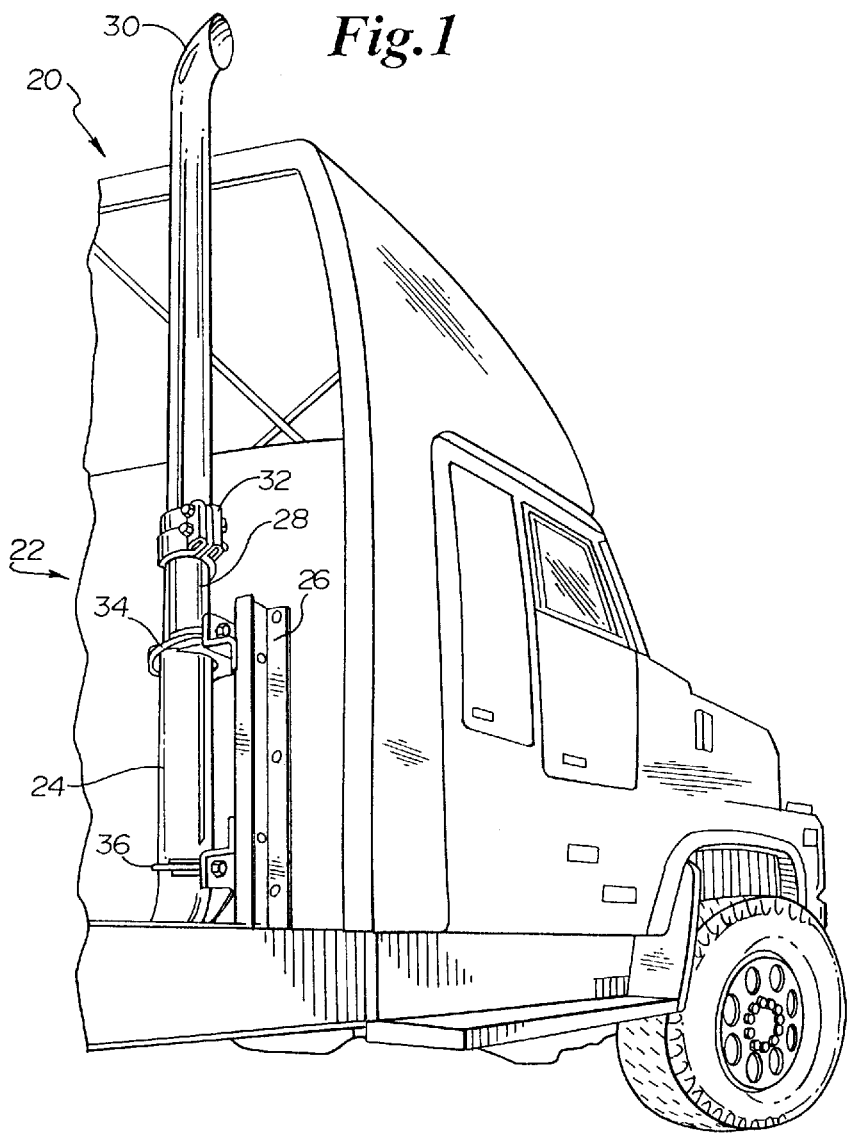
FIG. 1 is a perspective view of a truck exhaust assembly depicting a band clamp sealing a lap joint, according to the present invention.

In reference now to FIG. 1, a truck 20 having an exhaust system 22 is illustrated. Exhaust system 22 includes a muffler 24 supported by a mounting bracket 26. A pair of guillotine or U-bolt type clamps 34, 36 secure a muffler 24 to a bracket 26.

Muffler 24 is in air-flow communication with a conduit or pipe 28, which is in air-flow communication with a second conduit or tail pipe 30. A wide band clamp 32 is illustrated securing first pipe 28 to second pipe 30 together in a lap joint.

Figure 2:
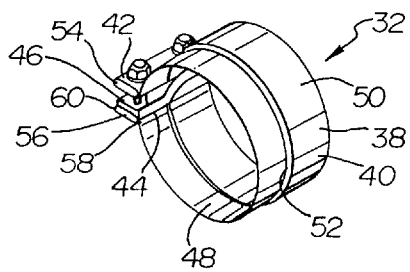
FIG. 2 is a perspective view of a first embodiment of a band clamp, according to the present invention.

Attention is now directed to FIG. 2. In FIG. 2, wide band clamp 32 is shown in perspective view. Band clamp 32 includes a ductile band 38. Band 38 generally comprises a rectangular metal strap which is formable and bendable into an arcuate or circular configuration to form a sleeve 40. Band 38 may comprise a variety of materials. Preferably, band 38 is constructed from a material having ductile properties such as stainless steel, for example, 0.018 inch thick stainless steel.

Band 38 has a first end 42 and a second opposite end 44. When arranged in a circular or sleeve-like configuration as shown in FIG. 2, first and second ends 42, 44 define opposite ends of a ring with a gap or space 46 therebetween.

Still referring to FIG. 2, it can be seen that band 38 does not have a uniform, consistent diameter. Rather, band 38 has different regions across its axial length which form different diameters. Specifically, band 38 includes a first region 48 having a first diameter, and a second region 50 adjacent to first region 48, having a diameter which is larger than the diameter of the first region. Due to the differences in diameter, there is a stepped transition portion 52 between the first region 48 and second region 50. The multiple diameters across band 38 permits for a more effective and better sealing of a lap joint. That is, because lap joints form a step due to differences in diameter of the two conduits forming the lap joint, the band 38 formed with the stepped portion 52 conforms to the stepped portion of the lap joint. The differences in diameter between the first region 48 and second region 50 depend upon the particular application. Typically, the diameter of the second region, or larger diameter, will be on the order of about 2–4 percent larger than the diameter of the first region, or smaller region. In the example illustrated in the drawings, the second region 50 has an inner diameter of about 5.25 inches while the inner diameter of the first region is about 5.08 inches. That is, the diameter of the second region 50 is about 3.3 percent larger than the diameter of the first region 48.

Still referring to FIG. 2, clamp 32 includes a first reinforcing bar 54 and a second reinforcing bar 56. First end 42 of band 38 is wrapped around first reinforcing bar 54. Second end 44 of band 38 is wrapped around second reinforcing bar. That is, the first and second ends 42, 44 are bent to conform around each respective reinforcing bar 54, 56. Each of the reinforcing bars 54, 56 is a rectangular member with opposite radiused edges 58, 60. First and second reinforcing bars 54, 56 are preferably constructed of a strong material of sufficient strength to provide a secure clamping assembly. For example, first and second reinforcing bars 54, 56 may be constructed of steel and be dimensioned to have a length of about 3.1 inches, a width of about 1 inch, and thickness of about 0.25 inches.

Figure 3:
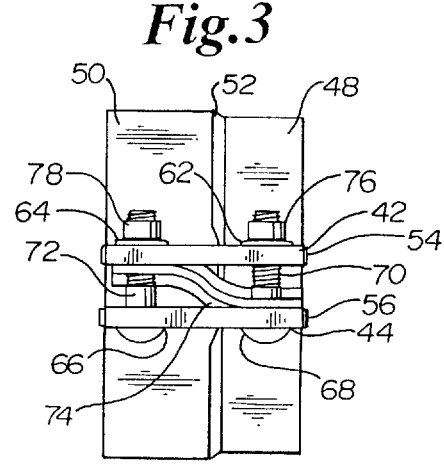
FIG. 3 is a side elevational view of the band clamp depicted in FIG. 2, according to the present invention.

In reference now to FIG. 3, it can be seen that the first end 42 of band 38 and the first reinforcing bar 54 define a pair of bolt receiving holes 62, 64. Analogously, the second end 44 of band 38 and second reinforcing bar 56 similarly define first and second holes 66, 68. When band 38 is formed in a sleeve-like or circular configuration around a joint, holes 62 and 64 are aligned with holes 66 and 68. A pair of bolts 70, 72 are passed therethrough and through an intermediate gasket 74, described more fully below, and tightened into a pair of nuts 76, 78. As each of the bolts 70, 72 are turned within nuts 76, 78, the gap or space 46 between the first end 42 and second end 44 is shortened. This tightens the sleeve 40 and the wide band clamp 32 around the joint. As described more fully below, gasket 74 maintains first and second reinforcing bars 54, 56 in a parallel relationship to ease the assembly. Also, gasket 74 is constructed and arranged to conform to the step of the lap joint as the bolts 70, 72 are tightened within nuts 76, 78.

Figure 4:
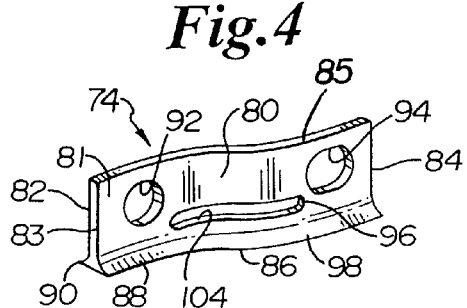
FIG. 4 is a perspective view of a gasket member used in the band clamp depicted in FIGS. 2 and 3, according to the present invention.

Attention is now directed to FIG. 4. In FIG. 4, gasket 74 is shown in perspective view. Gasket 74 generally comprises an elongate main portion, or first portion, 80 having first and second opposite sides 81, 82 between opposite ends 83, 84. Main portion 80 also defines a top end 85 extending longitudinally between first and second ends 83, 84 and an opposite bottom end 86. As used herein, the term "elongate" means that the distance between first and second ends 83, 84 is greater than the distance between top and bottom ends 85, 86. Projecting outwardly from first side 80 and extending longitudinally along bottom end 86 of main portion 80 is a first flange 88. Analogously, projecting outwardly from second side 82 and extending longitudinally along bottom end 86 is a second flange 90. Main portion 80 also defines a first circular bolt receiving hole 92 and a second oval shaped or elongate circular shape bolt receiving hole 94.

Gasket 74 is oriented between first and second ends 42, 44 of band 38 within the gap 46, such that first and second flanges 88, 90 are located adjacent to and over the seam or step of the lap joint. Flanges 88, 90 eliminate problems associated with pinching of flex tube between the first and second ends 42, 44, when flex tube is used as one of the conduits of the lap joint. In prior art arrangements, when flex tube was used in a lap joint, it sometimes became pinched or caught within the gap between the opposite ends of the clamp. Due to the cantilevered, outwardly extending flanges 88, 90, flex tubes or hoses are prevented from being caught or trapped between the first and second reinforcing bars 54, 56.

Turning now to FIG. 5, as can be seen, together the width, i.e. transverse length, of first and second flanges 88, 90 is several times larger than the thickness of main portion 80. Preferably, the total distance between outer edge of flange 88 and outer edge of flange 90 is about 3–5 times, typically about 3.7 times the distance across the thickness of main portion 80 (that is, the thickness across top end 85). For example, in the illustrated embodiment, top end 85 has a thickness of about 0.125 inches, while the distance between outer edge of flange 88 and outer edge of flange 90 is about 0.46 inches.

Turning again to FIG. 4, first and second bolt receiving holes 92, 94 are configured to align with holes 62, 64, 66, 68, respectively. Second bolt receiving hole 94 is enlarged and elongate in order to help provide for the length change of gasket 74, as the clamp 32 is closed and straightens the gasket 74.

Gasket 74 is constructed and arranged to allow the gasket 74 to conform to the step of a lap joint. That is, gasket 74 is configured to permit gasket 74 to deform in a manner which allows its bottom end to assume the profile of the lap joint, particularly the step of the lap joint. This allows for a tighter, more secure seal.

Specifically, main portion 80 of gasket 74 defines a deformation opening 96. Due to deformation opening 96, there is a deformable strip 98 of deformable gasket member. Strip 98 is positioned between bottom end 86 and bottom edge of deformation opening 96. Strip 98 absorbs forces and stresses as clamp 32 is positioned and tightened around the lap joint. Deformation opening 96 allows strip 98 to move inwardly toward an upper portion of deformation opening 96. That is, strip 98 collapses into deformation opening 96, to conform to the step of the lap joint.

Figure 15:
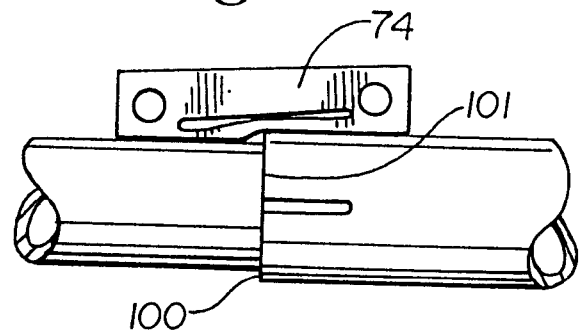
FIG. 15 is a front elevational, somewhat schematic, view of a gasket member of the present invention depicted positioned over a lap joint but without the remaining clamp assembly for purposes of clarity.

An example of this is illustrated schematically in FIGS. 14 and 15. In FIG. 14, prior art gasket 99 is shown over the step 100 of lap joint 101. As can be seen, gasket 99 leaves a space or gap between gasket 99 and lap joint 100. Gasket 99 does not conform to the step 100 of lap joint 101. As shown in FIG. 15, gasket 74 deforms over step 100 in lap joint 101. That is, strip 98 deforms or bends inwardly to collapse or close deformation opening 96. This deforms bottom end 86 of gasket 74 to assume the profile and conform to step 100. This allows for a tight, effective seal of lap joint 101.

While a variety of working embodiments are contemplated, in the particular embodiment illustrated in FIG. 4, deformation opening 96 comprises a longitudinal slot 104. Slot 104 is an elongate channel or groove defining a throughhole extending between first and second sides 81, 82. Slot 104 is located between bolt receiving apertures 92, 94 and spaced from and below bolt receiving apertures 92, 94. In alternate embodiments, slot 104 is in open communication with bolt receiving holes 92, 94. In this specific embodiment, slot 104 typically extends a length of about 40–65 percent, typically about 50 percent, of a length of main portion 80 between end 83 and end 84. Slot 104 typically is spaced a distance of about 0.1–0.3, typically about 0.2 inches above bottom end 86, and is positioned adjacent to first and second flanges 88, 90.

In accordance with the invention, the gasket 74 is constructed and arranged to maintain the first and second reinforcing bars 54, 56 in parallel alignment, when the clamp 32 is tightened around the step of the lap joint. As embodied herein and in reference in particular to FIG. 5, main portion 80 of gasket 74 is constructed to absorb the forces and stresses in order to keep the first and second reinforcing bars 54, 56 evenly spaced from one another or parallel. This helps to provide for an easier installation and assembly. That is, when tightening bolts 70, 72 within nuts 76, 78, when the first and second reinforcing bars 54, 56 are maintained evenly spaced from one another or parallel, the bolts 70, 72 are generally maintained straight with respect to the nuts 76, 78. This allows for smooth, easy assembly.

As can be seen in FIG. 5, in this particular embodiment, the gasket member 74 is configured and arranged to be curved. That is, the first side 81 along with flange 88 forms a smooth curve. Similarly, second side 82 along with flange 90 forms a smooth curve which follows and conforms with the curve of first side 81 and flange 88. Specifically, gasket 74, when viewed in top plan as in FIG. 5, forms an elongate Z-shape curve 110. When positioned between first and second reinforcing bars 54, 56 within gap 46 of clamp 32, the elongate Z-shape curve 110 defines generally a first gasket region 106, a second gasket region 108, and smooth transition portion 107 therebetween. First gasket region 106 engages first end 42, and is spaced a first distance from second end 44 of band 38. Second gasket region 108 engages second end 44 and is spaced the same first distance from first end 42. That is, gasket 74 is symmetrical.

In reference to FIG. 3, gasket 74 is shown positioned or oriented between first and second ends 42, 44 in clamp 32. First gasket region 106 can be seen engaging first end 42 while it is spaced from second end 44. Second gasket region 108 can be seen engaging second end 44, while it is spaced from first end 42. It should be understood that the illustration in FIG. 3 is prior to tightening of bolts 70, 72 within nuts 76, 78. When the bolts 70, 72 are tightened within nuts 76, 78, gasket 74 maintains the first and second ends 42, 44, and therefore the first and second reinforcing bars 54, 56, in parallel relation. As the bolts 70, 72 are tightened within nuts 76, 78, gasket 74 absorbs stresses and forces and deforms from its curved, Z-shape into a generally, substantially straight shape.

Preferably, the bolts 70, 72 have a diameter in relation to the diameter of holes 66, 68 in second end 44 and hole 92 of gasket 74 in a tight fit, or a press fit. This helps to keep the bolts and gasket in place. These pieces are held together with the band 38 due to the press fits between the bolts 70, 72 and the holes 66, 68, 92. Nuts 76, 78 are placed over the ends of bolts 70, 72, to result in a one-piece assembly. The end of the bolt threads on each of the respective bolts 70, 72 is then deformed or bent in a manner and configuration to prevent the nuts 76, 78 from coming off of each of their respective bolts 70, 72, such as during shipping, etc. To use, clamp 32 is axially inserted over the tube lap joint. Nuts 76, 78 are then placed over the ends of bolts 70, 72. Nuts 76, 78 are tightened onto bolts 70, 72. As they are tightened, slot 104 deforms or collapses to assume the shape and profile of step 100 of lap joint 101 (FIG. 15). Gasket 74 maintains the first and second reinforcing bars 54, 56 in an even, spaced relationship relative to each other. Eventually, the Z-shape 110 of gasket 74 disappears as the curve straightens to take on a generally straight or linear configuration, and the slot 94 (FIG. 4), allows the straightening to properly occur.

Figure 6:
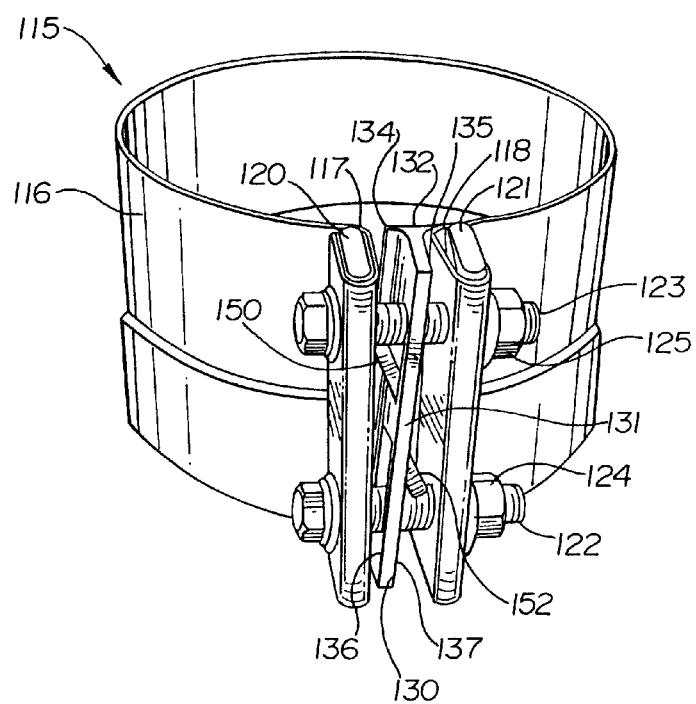
FIG. 6 is a perspective view of a second embodiment of a band clamp, according to the present invention.

Attention is now directed to FIG. 6. In FIG. 6, a second embodiment of a wide band clamp is shown generally at 115. Wide band clamp 115 includes a band 116 analogous to band 38. Band 116 has first and second opposite ends 117, 118. First and second ends 117, 118 are wrapped around first and second reinforcing bars 120, 121. First and second bolts 122, 123 pass through the first and second ends 117, 118 and the first and second reinforcing bars 120, 121 to connect the first end 117 to the second end 118 to form a circular clamp or sleeve. First and second bolts 122, 123 are tightened in first and second nuts 124, 125.

It should be appreciated that all of the structure described herein thus far for the FIG. 6 embodiment of band clamp 115 is analogous to structure described for the FIG. 2 embodiment of band clamp 32.

Still in reference to FIG. 6, a gasket 130 is positioned between first and second ends 117, 118 of band 116. Gasket 130 defines a top longitudinal edge 131 and an opposite, bottom longitudinal edge 132. That is, bottom edge 132 is disposed on the radial side of clamp 115 to be adjacent to engage the lap joint. Also seen in FIG. 6 is first and second flanges 134, 135 in extension from first and second sides 136, 137 of the main portion of gasket 130. First and second flanges 134, 135 are analogous to flanges 88, 90 of the first embodiment and provide an analogous function.

In reference now to FIG. 7, gasket 130 defines first and second bolt receiving apertures 140, 141. First and second bolt receiving apertures 140, 141 align with the bolt holes in the first and second ends 117, 118 and first and second reinforcing bars 120, 121. As can be seen in FIG. 7, first and second apertures 140, 141 include rounded portions closed by a straight portion. That is, first and second bolt receiving apertures 140, 141 have a shape of truncated ovals or D-profiles. Still in reference to FIG. 7, gasket 130 includes a deformation opening 142. Deformation opening 142 is analogous to the deformation opening 96 in the first embodiment. Deformation opening 142 allows gasket 130 to deform and conform to the profile of the step of the lap joint, as seen, for example, in FIG. 15. In the particular embodiment illustrated in FIG. 7, deformation opening 142 comprises an elongate channel, groove, or slot 144. Slot 144 extends longitudinally adjacent to first and second flanges 134, 135 and is positioned between first and second bolt receiving apertures 140, 141. Elongate slot 144 is in communication with apertures 140, 141. That is, open channels 146, 148 are defined between apertures 140, 141 and slot 144. In this way, gasket 130 is allowed to adjust for and conform to the step of the lap joint.

In reference now to FIG. 8, clamp assembly 115 is constructed and arranged to maintain the first and second reinforcing bars 120, 121 in parallel alignment when the clamp 115 is tightened around the step of the lap joint. In the first embodiment, this function may be accomplished by the overall shape of the gasket 74. That is, the gasket 74 can define a curve, preferably Z-shaped curve 110, to maintain the equal spacing between the reinforcing bars. In the second embodiment, gasket 130 defines a pair of cantilever members or tabs 150, 152 projecting outwardly from first side 136 and second side 137, respectively, of gasket 130. First tab 150 extends, projects, or is cantilevered from first side 136. It is deformable and received within a tab receiving opening 154 defined by gasket 130. Similarly, second tab 152 extends, or projects, or is cantilevered from second side 137 of gasket 130. Second tab 152 is deformable and received within second tab receiving opening 156.

When gasket 130 is oriented between first and second ends 117, 118, first and second tabs 150, 152 help to maintain an evenly spaced, parallel relationship between first and second reinforcing bars 120, 121. That is, first tab 150 touches and engages first end 117 of band 116. In this way, first tab 150 maintains a distance between first side 136 and first end 117, and therefore first reinforcing bar 120. Second tab 152 engages second end 118 so that second side 137 is spaced from second end 118 and second reinforcing bar 121 the same distance as the distance between first end 117 and first reinforcing bar 120.

As bolts 122, 123 are tightened within nuts 124, 125, tabs 150, 152 are pressed inwardly into respective tab receiving openings 154, 156. This keeps the first and second reinforcing bars 120, 121 evenly spaced and allows for easier and more convenient assembly. Further, it provides an indicator for whether the clamp has been properly tightened around the lap joint. In other words, when the first and second tabs 150, 152 are pushed into their respective openings 154, 156, and the reinforcing bars 120, 121 are parallel, the user will know that clamp 115 is oriented and tightened properly over the lap joint.

FIG. 10 illustrates clamp 115 prior to band 116 being configured into the circular sleeve-like configuration shown in FIG. 6. FIG. 10 also illustrates a convenient assembly for clamp 115. Clamp 115 may be assembled to include bolts 122, 123 press fit into first end 117 and first reinforcing bar 120 with gasket 130 placed thereover. To mount clamp 115 around a lap joint, this first piece is wrapped around the seam, and the bolts are placed through the second end 118 and second reinforcing bar 121. At that point, the nuts 124, 125 are installed thereover. As the nuts are tightened, the gasket 130 slides on the press fit area A of the bolts. Slot 144 deforms and collapses inwardly on itself to assume the profile of the step in the lap joint. Tabs 150, 152 are compressed inwardly toward their respective tab receiving openings 154, 156. Tabs 150, 152, in this way, help maintain the first and second reinforcing bars 120, 121 in a parallel orientation.

Figure 11:
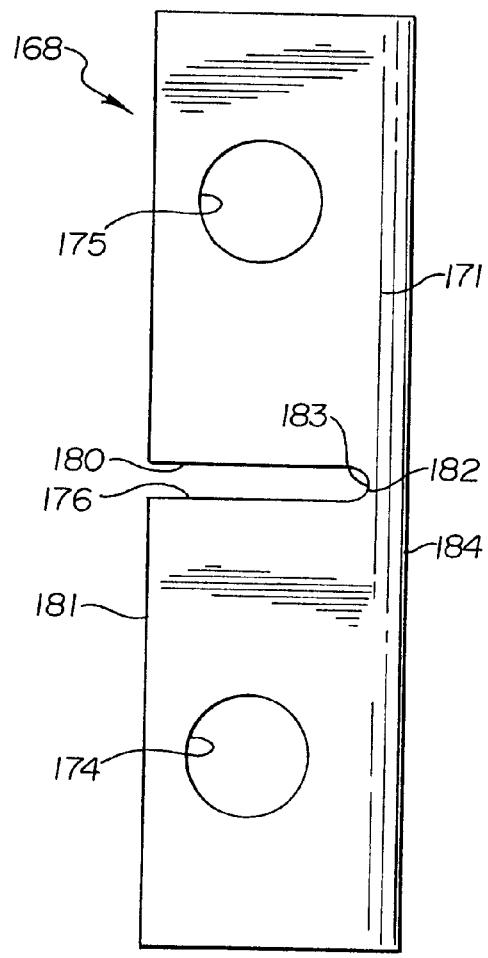
FIG. 11 is a side elevational view of a second embodiment of a gasket member usable in the band clamp depicted in FIG. 6, according to the present invention.
Figure 12:
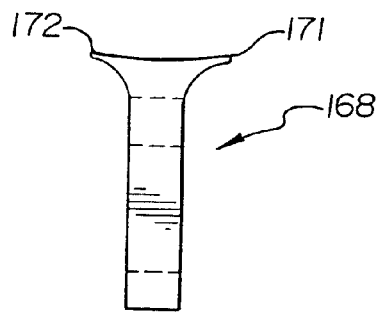
FIG. 12 is a end elevational view of the gasket member depicted in FIG. 11, according to the present invention.
Figure 13:
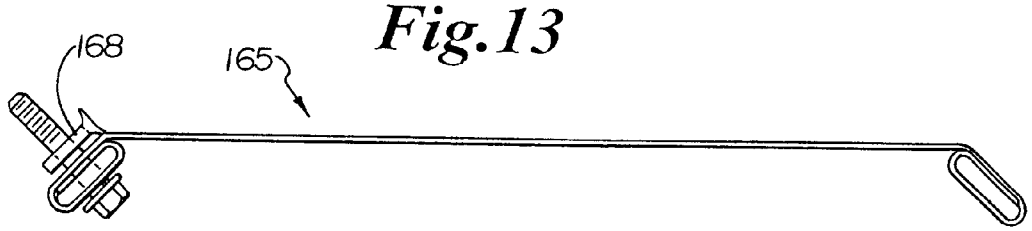
FIG. 13 is a side elevational view of the band clamp of FIG. 6 with the gasket member of FIG. 11, prior to being wrapped around a lap joint, according to the present invention.

Attention is now directed to FIGS. 11–13. A third embodiment of a wide band clamp is shown generally at 165. Band clamp 165 is analogous in all respects to the first and second embodiments, with the exception of gasket 168. Gasket 168 defines first and second flanges 171, 172, analogous to flanges 88, 90 and 134, 135. Situated between bolt receiving apertures 174, 175 is a deformation opening 176. As with deformation openings 96 and 142, deformation opening 176 can allow gasket 168 to adjust and to conform to the profile and shape of the step of a lap joint. In this embodiment, deformation opening 176 comprises a transverse channel, or groove, or slot 180. Transverse slot 180 is open to the top end 181 of gasket 168. A deformation strip 182 is located between an end portion 183 of slot 180 and bottom end 184 of gasket 168. When the band clamp 165 is put around a lap joint and the bolts are tightened, transverse slot 180 permits gasket 168 to deform by bending at region 182. This allows gasket 168 to conform or adjust or accommodate the step in the lap joint.

Deformation opening 176 may generally extend a distance of at least 75%, typically 80–95%, and usually no more than 98% of a height of the gasket 168. In this context, "height" refers to the distance between top end 181 and bottom end 184.

It should be appreciated that although slot 180 is depicted as being open to top end 181, and thus being an open ended slot, other embodiments can include transverse slot 180 being closed at both ends, including the top end 181.

III. A Specific Preferred Embodiment

It will be understood that a wide variety of specific configurations and applications are feasible, using techniques described herein. In this section, particular clamp arrangements are described.

The clamp arrangement 32 depicted in FIGS. 2–5 is described herein with particularity. Band 38 has an inner diameter at the first region 48 of about 5.08 inches (about 129 mm). At the second region 50, it has an inner diameter of about 5.25 inches (about 133 mm). The width of band 38 is about 3 inches (about 76 mm). The distance between the central axis of bolts 70 and 72, when assembled in clamp 32 is about 1.9 inches (about 48 mm). The width of first region 48 is about 1.5 inches (about 38 mm), and the width of second region 50 is about 1.5 inches (about 38 mm). Each of the reinforcing bars 154, 156 has dimensions of 0.25×1× 3.12 inches (about 6×25×79 mm). The radius of the bolt holes in each of the reinforcing bars 54, 56 is about 0.22 inches (about 6 mm).

Gasket 74 has a length between ends 83, 84 of about 2.9 inches (about 74 mm). This is the length after bending into the Z-shape. Prior to bending into the Z-shape, gasket 74 is about 3 inches (about 76 mm) long. The first bolt receiving aperture 92 has a diameter of about 0.44 inches. The elongate hole 94 has dimension of about 0.55×0.44×0.22 inches radius (about 14×11×6 mm). The distance between end 84 and the center of hole 94 is about 0.5 inches (about 13 mm). The distance between top edge 85 and the center of hole 94 is about 0.35 inches (about 9 mm). The height of gasket 74 is about 0.92 inches (about 23 mm). The thickness at the non-flanged region is about 0.125 inches (about 3 mm). The thickness at the flanged end is about 0.46 inches (about 12 mm). Each of the flanges forms a curved surface with main portion of gasket with a radius of about 0.16 inches (about 4 mm).

The above specification, examples, and data provide a complete description of the manufacture and use of the invention. Many embodiments of the invention can be made without departing from the spirit and scope of the invention.

I claim:

1. A gasket member for use in sealing a lap joint with a pipe band clamp, the lap joint including a step formed between overlapping pipes, the gasket member comprising:
   (a) a first portion defining at least one bolt opening extending therethrough; the first portion having opposite sides;
      (i) said first portion defining a deformation opening for allowing the gasket member to conform to the step of the lap joint;
      (ii) said first portion of the gasket member is constructed and arranged to maintain a pair of spacer bars on a clamp assembly in parallel alignment, when the gasket member is positioned between the spacer bars and the clamp assembly is tightened around the step of the lap joint; and
   (b) a pair of flanges projecting outwardly from said opposite sides of the first portion; said flanges extending longitudinally along one end of the first portion.

2. A gasket member according to claim 1 wherein:
   (a) said opposite sides of said first portion are curved.

3. A gasket member according to claim 1 wherein:
   (a) said first portion defines an elongate Z-shape.

4. A gasket member according to claim 1 wherein:
   (a) said first portion of the gasket member includes at least a pair of cantilever members projecting outwardly from said opposite sides of said first portion of the gasket member.

5. A gasket member according to claim 4 wherein:
   (a) said first portion defines a pair of cantilever receiving openings constructed and arranged to receive said cantilever members, when the cantilever members are pressed toward the first portion of the gasket member.

6. A gasket member according to claim 1 wherein:
   (a) said deformation opening comprises a longitudinal slot.

7. A gasket member according to claim 6 wherein:
   (a) said longitudinal slot is adjacent to said flanges.

8. A gasket member according to claim 6 wherein:
   (a) said first portion of the gasket member defines first and second bolt holes; and
   (b) said longitudinal slot is in communication with said first and second bolt holes.

9. A gasket member according to claim 1 wherein:
   (a) said deformation opening comprises a transverse slot through the first portion of the gasket member; said transverse slot being open to a top end of said gasket member.

10. A gasket member according to claim 9 wherein:
    (a) said transverse slot extends at least about 75% of a height of said gasket member.

11. A gasket member for use in sealing a lap joint with a pipe band clamp, the lap joint including a step formed between overlapping pipes, the gasket member comprising:
    (a) a first portion defining at least one bolt opening extending therethrough; the first portion having opposite sides;
       (i) said first portion defining a deformation opening for allowing the gasket member to conform to the step of the lap joint;
          (A) said deformation opening comprising a longitudinal slot extending at least about 40% of a length of said first portion of the gasket member; and
    (b) a pair of flanges projecting outwardly from said opposite sides of the first portion; said flanges extending longitudinally along one end of the first portion.

12. A gasket member according to claim 1 wherein:
    (a) said longitudinal slot is adjacent to said flanges.

13. A gasket member according to claim 1 wherein:
    (a) said first portion of the gasket member defines first and second bolt holes; and
    (b) said longitudinal slot is in communication with said first and second bolt holes.

14. A gasket member according to claim 1 wherein:
    (a) said first portion of the gasket member is constructed and arranged to maintain a pair of spacer bars on a clamp assembly in parallel alignment, when the gasket member is positioned between the spacer bars and the clamp assembly is tightened around the step of the lap joint.

15. A gasket member according to claim 14 wherein:
    (a) said opposite sides of said first portion are curved.

16. A gasket member according to claim 15 wherein:
    (a) said first portion defines an elongate Z-shape.

17. A gasket member according to claim 14 wherein:
    (a) said first portion of the gasket member includes at least a pair of cantilever members projecting outwardly from said opposite sides of said first portion of the gasket member.

18. A gasket member according to claim 17 wherein:
    (a) said first portion defines a pair of cantilever receiving openings constructed and arranged to receive said cantilever members, when the cantilever members are pressed toward the first portion of the gasket member.

19. A clamp arrangement for sealing a lap joint, the lap joint including a step formed between overlapping conduits of dissimilar diameters, the clamp arrangement comprising:
(a) first and second reinforcing bars;
(b) a ductile band having first and second end portions; said first end portion being wrapped around said first reinforcing bar; said second end portion being wrapped around said second reinforcing bar;
 (i) said first end portion and said first reinforcing bar defining a pair of bolt-receiving apertures therethrough;
 (ii) said second end portion and said second reinforcing bar defining a pair of bolt-receiving apertures therethrough;
(c) a gasket member positioned between said first and second reinforcing bars;
 (i) said gasket member defining a pair of bolt-receiving apertures therethrough;
 (ii) said gasket member defining a deformation opening for allowing the gasket member to conform to the step of the lap joint; and
(d) a pair of bolts extending through each of said bolt-receiving apertures of said first end portion and first reinforcing bar; said second end portion and second reinforcing bar; and said gasket member.

20. A clamp arrangement according to claim 19 wherein:
(a) said gasket member defines a pair of flanges projecting outwardly from opposite sides of said gasket member; said flanges extending longitudinally along one end of the gasket member.

21. A clamp arrangement according to claim 20 wherein:
(a) said deformation opening comprises a longitudinal slot extending at least about 40% of a length of said gasket member.

22. A clamp arrangement according to claim 21 wherein:
(a) said longitudinal slot is in communication with said gasket member bolt-receiving apertures.

23. A clamp arrangement according to claim 20 wherein:
(a) said deformation opening comprises an open, transverse slot in extension at least about 75% of a height of said gasket member.

24. A clamp arrangement according to claim 20 wherein:
(a) said gasket member is constructed and arranged to maintain said first and second reinforcing bars in parallel alignment, when the clamp arrangement is tightened around the step of the lap joint.

25. A clamp arrangement according to claim 24 wherein:
(a) said gasket member includes deformable compression tabs that project outwardly from opposite sides; said compression tabs being arranged and configured to maintain a substantially parallel relationship between said first and second reinforcing bars as the bolts are tightened.

26. A clamp arrangement according to claim 24 wherein:
(a) said gasket member is curved to define an elongate Z-shape.

27. A clamp arrangement according to claim 20 wherein:
(a) said band includes a first region having a first diameter, a second region having a second diameter larger than said first diameter, and a stepped portion between said first and second regions, when said band is configured in a circular configuration.

28. A method for sealing a lap joint, the lap joint including a step formed between overlapping conduits of dissimilar diameters, the method comprising:
(a) wrapping a band around the step of the lap joint; the band having first and second opposite ends;
(b) positioning a gasket member between the first and second ends of the band; the gasket member defining a slot therethrough;
(c) bolting the first and second band ends together with the gasket member therebetween; and
(d) deforming the slot in the gasket member to allow the gasket member to conform to the step of the joint.

29. A method according to claim 28 further including:
(a) during said step of bolting, maintaining a pair of spacer bars on the band in parallel alignment.

30. A method according to claim 29 wherein:
(a) said step of maintaining includes using deformable compression tabs on the gasket member to maintain a substantially parallel relationship between the pair of spacer bars.

31. A method according to claim 28 wherein:
(a) said step of positioning a gasket member includes positioning a gasket member including a first portion having at least one bolt opening extending therethrough; the first portion having opposite sides; said first portion having the slot for allowing the gasket member to conform to the step of the lap joint.

32. A method according to claim 31 wherein:
(a) said step of positioning a gasket member includes positioning a gasket member having a pair of flanges projecting outwardly from the opposite sides of the first portion; the flanges extending longitudinally along one end of the first portion.

33. A method according to claim 31 wherein:
(a) said step of positioning a gasket member includes positioning a gasket member, wherein the slot comprises a longitudinal slot extending at least about 40% of a length of the first portion of the gasket member.

34. A method according to claim 31 wherein:
(a) said step of positioning a gasket member includes positioning a gasket member, wherein the opposite sides of the first portion are curved.

35. A method according to claim 31 wherein:
(a) said step of positioning a gasket member includes positioning a gasket member, wherein the slot comprises a transverse slot through the first portion of the gasket member extending at least about 75% of a height of the gasket member.

36. A method according to claim 31 wherein:
(a) said step of positioning a gasket member includes positioning a gasket member, wherein the first portion of the gasket member includes at least a pair of cantilever members projecting outwardly from the opposite sides of the first portion of the gasket member.

37. A gasket member for use in sealing a lap joint with a pipe band clamp, the lap joint including a step formed between overlapping pipes, the gasket member comprising:
(a) a first portion defining at least one bolt opening extending therethrough; the first portion having opposite sides;
 (i) said first portion defining a deformation opening for allowing the gasket member to conform to the step of the lap joint;
  (A) the deformation opening comprising a transverse slot through the first portion of the gasket member; and
(b) a pair of flanges projecting outwardly from said opposite sides of the first portion; said flanges extending longitudinally along one end of the first portion.

38. A gasket member according to claim 37 wherein:

(a) said transverse slot extends at least about 75% of a height of said gasket member.

39. A gasket member according to claim 38 wherein:

(a) said first portion of the gasket member is constructed and arranged to maintain a pair of spacer bars on a clamp assembly in parallel alignment, when the gasket member is positioned between the spacer bars and the clamp assembly is tightened around the step of the lap joint.

40. A gasket member according to claim 37 wherein:

(a) said transverse slot is open to a top end of said gasket member.

* * * * *